Dec. 26, 1961  H. W. BOTELER  3,014,690
BALL VALVE
Filed Sept. 26, 1960  3 Sheets-Sheet 2

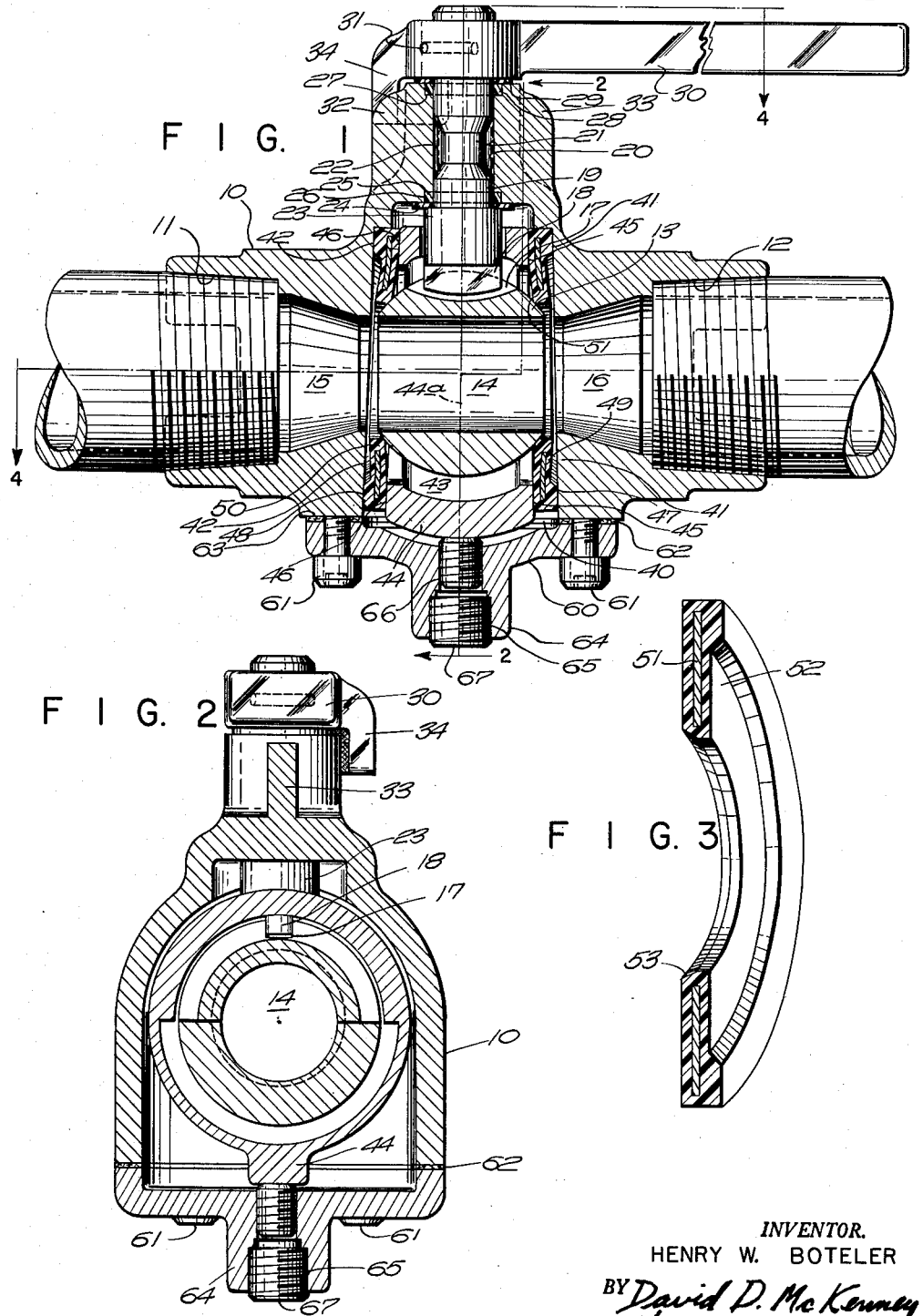

INVENTOR.
HENRY W. BOTELER
BY David D. McKenney
Herman Foster
ATTORNEYS

Dec. 26, 1961 H. W. BOTELER 3,014,690
BALL VALVE
Filed Sept. 26, 1960 3 Sheets-Sheet 3

INVENTOR.
HENRY W. BOTELER
BY David D. McKenney
Herman Foster
ATTORNEYS

United States Patent Office 3,014,690
Patented Dec. 26, 1961

3,014,690
BALL VALVE
Henry W. Boteler, East Greenwich, R.I., assignor to Grinnell Corporation, Providence, R.I., a corporation of Delaware
Filed Sept. 26, 1960, Ser. No. 58,354
13 Claims. (Cl. 251—174)

This invention relates to valves and more particularly to the type of plug cock valve known as a ball valve.

An object of this invention is to provide a ball valve which contains a positive and effective sealing construction.

Another object of this invention is to provide a ball valve containing a unitized sealing which compensates for wear and thereby provides a longer effective period of use.

A further object is to provide a ball valve wherein the seal is an annular disc spring, totally enclosed and thus protected from any corrosive effects of the material flowing through the valve.

A still further object is to provide a ball valve having a one piece resilient seal which does not require a jamming or compression between the ball cock and body for effective sealing.

Still another object is to provide a ball valve wherein the body seal may be easily forced into positive sealing engagement with the body.

Other objects will be made clear from an examination of the following specification and drawings in which:

FIGURE 1 is a longitudinal cross section of the valve of the present invention.

FIGURE 2 is a cross section taken along line 2—2 of FIG. 1.

FIGURE 3 is a sectioned perspective view of the seating-sealing ring.

Figure 4:
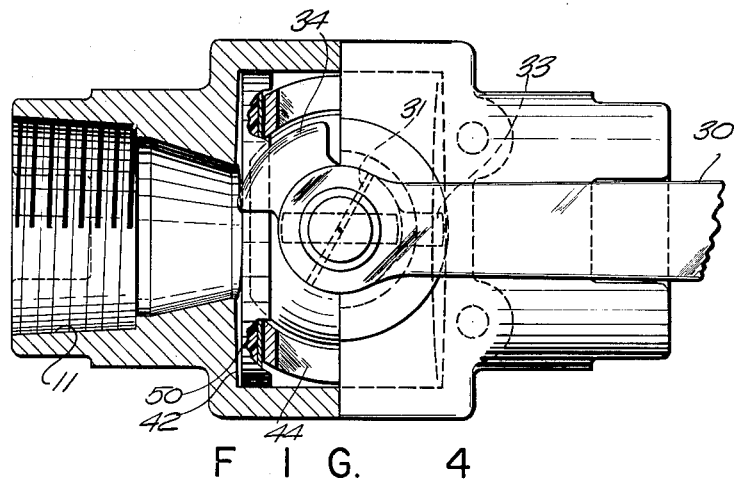
FIGURE 4 is a partially sectioned plan view of the valve of the present invention taken along line 4—4 of FIG. 1.
Figure 5:
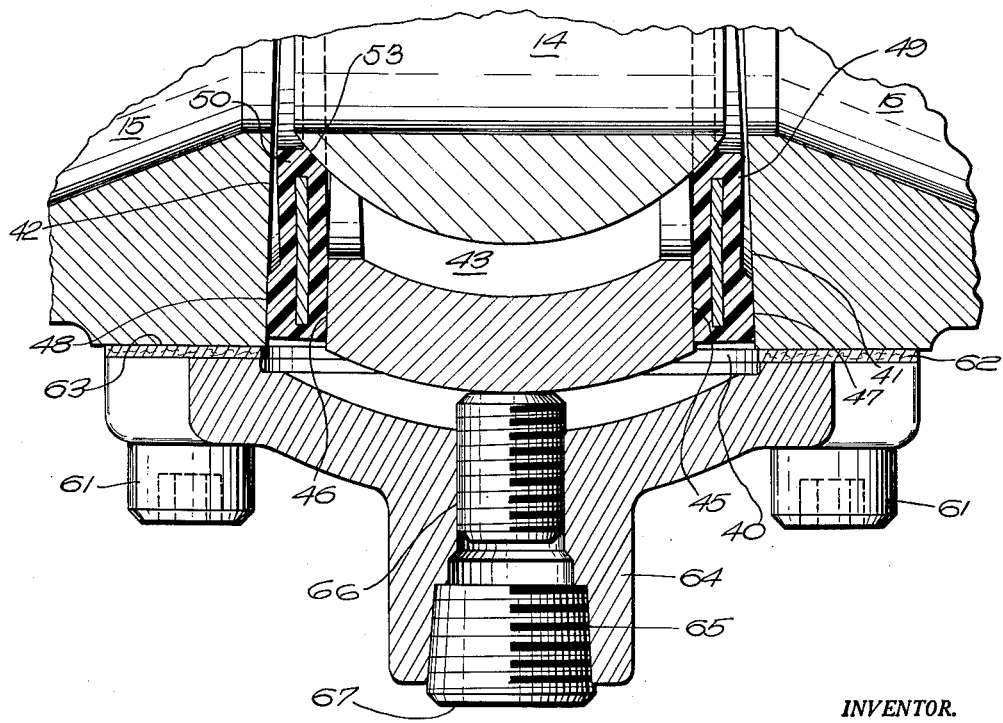
FIGURE 5 is a fragmentary sectional view of the bottom portion of FIG. 1 enlarged to illustrate the wedging construction of the valve seal.

It is contemplated that my invention is particularly suited for ball valves having a one piece body formed by the die forge process and/or of molded plastic material.

Referring to the drawing in greater detail, the numeral 10 indicates a one piece hollow valve body. Each end of the body is provided with a means for joining said valve to a flow line. In this preferred case the ends are threaded as at 11 and 12. Within the body is a plug 13 of generally spherical configuration and referred to as a ball cock. A transverse bore 14 extends through this plug and is in alignment with the passages 15 and 16 in the body when the plug is in the open position. The ball is grooved in its upper portion as at 17 to receive the flattened lower portion 18 of operating spindle 13. This spindle is preferably of one piece construction and extends through the top of the body via a hole 20. The central portion 21 of the spindle is reduced in diameter to provide a recess 22 which contains grease to provide a twofold action of sealing and lubricating. The recess is normally packed when the valve is being assembled however, if desired, a fitting may be placed in the body for convenient access from the outside to the recess. Just above the flattened lower portion 18 of the spindle 19 is a circular shoulder portion 23. This supports a washer 24 which in turn supports an O-ring at the bottom of hole 20 in an enlarged stepped portion 26 of the body. The body at the top of hole 20 also contains an enlarged stepped portion 27 in which an O-ring 28 is placed. Holding this O-ring 28 in place is a washer 29 interposed between the body and an actuating handle 30. The handle is fastened to spindle 19 by means of a pin 31 inserted in aligned holes through the handle and the spindle. Of course other ways may be utilized for joining the handle to the spindle. For that matter, means other than a handle may be used to turn the spindle.

The O-rings 25 and 28 and washers 24 and 29 are preferably made of the fluorinated polymer sold under the trademark Teflon and respectively serve as seals and bearings for the spindle. Integral with the body are two abutments 32 and 33 which are engaged by a stop 34 extending from handle 30. These limit the opening and closing movement of the handle and the ball.

At the bottom of the body is an opening 40 from which flat walls 41 and 42 converge toward the top, thus forming a truncated wedge shaped cavity 43 in the body substantially at right angles to the passages 15 and 16. Within said cavity is a ring wedge 44 whose sides 45 and 46 are tapered in parallel orientation to the walls 41 and 42 respectively.

For ease in manufacturing the rings and assembling the valve this ring 44 may be split along line 44a. However, this is discretionary with one skilled in the art. Tightly retained between the sides 41 and 45 and the sides 42 and 46 are the enlarged shoulder portions 47 and 48 of seating-sealing rings 49 and 50. These seating-sealing rings are each formed of an annular disc spring 51, preferably a Belleville spring, covered completely by a coating 52 of a suitable rubber, rubber-like or plastic material, shaped with shoulders as described above. The fluorinated polymer sold under the trademark Teflon and reinforced with powdered glass is presently the preferred covering material because this material has great bearing properties, is corrision resistant and ably protects the spring. The ball 15 is fitted between the seating-sealing rings 49 and 50 so that the chamfered inner circumference 53 is firmly pressed against the ball to provide a tight seal. This is due to the fact that the ball is slightly larger at the place where the seating-sealing ring would normally be, thus causing the seating-sealing ring to flex outwardly. The spring 51 resists this flexure so that a large sealing force is derived for the ball. In addition, because of the space between the seating-sealing rings and walls 41 and 42 the line pressure is made available to provide further sealing effort on the seating-sealing rings.

The cavity 43 is closed by a cap shaped plate 60 which is held in position by four screws 61. The plate and cavity are sealed by a gasket 62 which is fitted on a flat shoulder portion 63 surrounding the mouth of the cavity. At the center of the plate is a protuberance 64. Through the protuberance and the plate is stepped hole 65 which is internally threaded. A set screw 66 is threaded into said hole and tightened as desired to urge the wedge ring 44 into tight retaining relation with the seating-sealing rings 49 and 50. The pressure of wedge ring 44 against the seating-sealing rings causes these rings to press against the body walls 41 and 42 and thereby act as body seals. At the outer end of the hole 65 a pipe plug 67 is tightly inserted to prevent leakage.

It is seen that access to the cavity 43 and bore 14 is easily obtained by merely removing screws 61 and plate 60. The ring 44 and ball 13 may be easily withdrawn and seating-sealing rings 49 and 50 easily removed and replaced as the situation may demand. When these parts are reassembled and the plate 60 drawn into sealing engagement with gasket 62 and shoulder portion 63 the valve is ready for service without its having been disturbed from its position in the pipe line.

Figure 6:
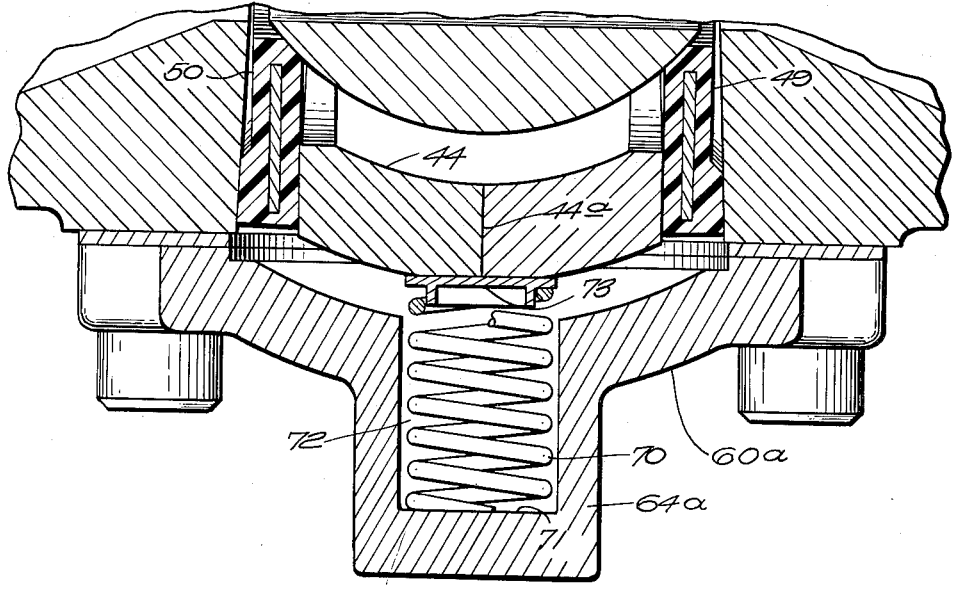
FIGURE 6 is a fragmentary sectional view similar to FIG. 5, but of another embodiment of the bottom portion.
Figure 7:
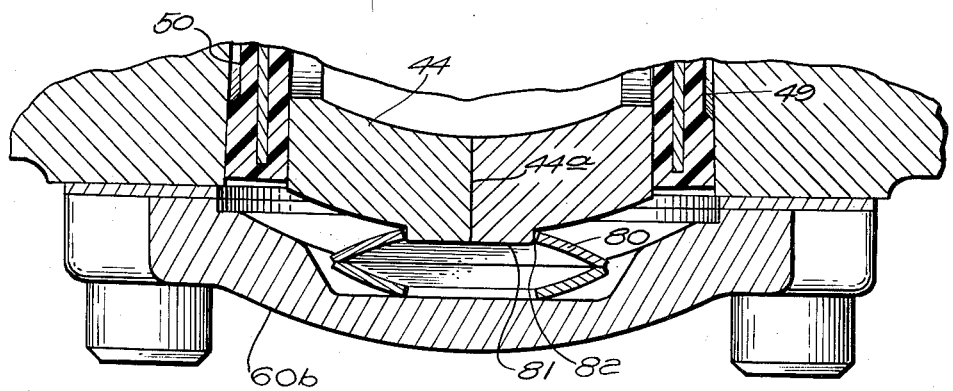
FIGURE 7 is a fragmentary sectional view similar to FIG. 5, but of still another embodiment of the bottom portion.

These advantages also accrue to the embodiments of FIGS. 6 and 7. In FIG. 6 a coil spring 70 is utilized to urge the wedge ring 44 into tight retaining relation with the seating-sealing rings 49 and 50. As a result the cap shaped plate 60a requires no pipe plug or other sealing means since the cap provides a solid support for the spring, at the bottom 71 of cavity 72, all within the protuberance 64a. At the wedge ring end of the spring a bearing plate 73 is provided to give a more positive abutment against the wedge ring 44. This ring is shown split along 44a, as previously described.

In FIG. 8, no protuberance is necessary. The cap shaped plate 60b is shown supporting a Belleville spring arrangement 80 to urge the wedge ring 44 into tight retaining relation with the seating-sealing rings 49 and 50. The wedge ring 44, as in FIG. 7 is shown split along 44a. To insure a positive force by the spring on the bottom of the wedge ring a raised portion 81 is placed at the bottom of the wedge ring which closely fits into an opening 82 in the spring 80.

In both the embodiments of FIGS. 6 and 7 protection against corrosion may be provided by coating the springs with a rubber, rubberlike or plastic material.

I claim:

1. A plug type valve comprising a body having a passageway therethrough and end connections at each end of said passageway, a lateral cavity in said body substantially at right angles to said passageway, said cavity having a mouth and two oppositely oriented walls converging toward each other from said mouth, a seating-sealing ring contiguous to each of said walls, means on each of said rings for spacing a portion of each of said rings from its adjoining wall, each of said rings being composed of a totally enclosed annular disc spring, means for forcing and retaining said rings in sealing engagement with said body walls, a spheroidal closure member interposed between said seating-sealing rings and flexing said rings in sealing engagement therewith, said member being mounted for rotational movement from an open to a closed position and having a port opening therethrough disposed in axial alignment with said passageway when said member is in open position, and means at said mouth for sealing said cavity.

2. A spherical ball type valve comprising a body having a passageway therethrough and end connections at each end of said passageway, a lateral cavity in said body substantially at right angles to said passageway, said cavity having a mouth and two oppositely oriented planar walls about said passageway and converging toward each other from said mouth, a flat seating-sealing ring contiguous to each of said walls with an opening through its center to said passageway, each of said rings being composed of an annular disc spring completely enclosed by a fluorocarbon plastic material and having a shoulder portion adjacent the outer periphery for spacing said ring from its adjoining wall, means for forcing and retaining each of said shoulder portions in sealing engagement with its contiguous body wall, a ball shaped closure member interposed between said seating-sealing rings and flexing said rings in sealing engagement therewith, and means at said mouth for sealing said cavity.

3. A spherical ball type valve comprising a body having a passageway therethrough and end connections at each end of said passageway, a lateral cavity in said body substantially at right angles to said passageway, said cavity having a mouth and opposed oriented planar walls about said passageway and converging toward each other from said mouth, a flat seating-sealing ring contiguous to each of said walls with an opening through its center to said passageway, each of said rings being composed of an annular disc spring completely covered by a fluorocarbon plastic material and having a shoulder portion adjacent the outer periphery for spacing said ring from its adjoining wall, a wedge shaped ring having converging end faces for retaining said shoulder portions in sealing engagement with their respective contiguous body walls, a ball shaped closure member within said wedge shaped ring and interposed between said seating-sealing rings into said openings, said ball flexing said seating-sealing rings in sealing engagement therewith, a cap fastened over said mouth for externally sealing said cavity and means cooperating with said cap for urging said wedge shaped ring to force said seating-sealing rings into sealing engagement with said body walls.

4. The apparatus as called for in claim 3 wherein said means cooperating with said cap is a set screw threaded through said cap.

5. The apparatus as called for in claim 3 wherein said means cooperating with said cap is a spring abutting against said cap.

6. The apparatus as called for in claim 5 wherein said spring is a coil spring.

7. The apparatus as called for in claim 5 wherein said spring is a Belleville spring.

8. A spherical ball type valve comprising a body having a passageway therethrough and end connections at each end of said passageway, a lateral cavity in said body substantially at right angles to said passageway, said cavity having a mouth and opposed oriented planar walls about said passageway and converging toward each other from said mouth, a flat seating-sealing ring contiguous to each of said walls with an opening through its center to said passageway, each of said rings being composed of an annular disc spring completely covered by a fluorocarbon plastic material and having a shoulder portion adjacent its outer periphery for spacing said ring from its adjoining wall, a wedge shaped ring having converging end faces for retaining said shoulder portions in sealing engagement with their respective contiguous body walls, said faces being spaced from and parallel to said respective walls, said wedge shaped ring being constructed of a plurality of abutting rings, a ball shaped closure member within said wedge shaped ring and interposed between said seating-sealing rings into said openings, said ball flexing said seating-sealing rings in sealing engagement therewith, means at said mouth for sealing said cavity and means cooperating with said last mentioned means for urging said wedge shaped ring to force said seating-sealing rings into sealing engagement with said body walls.

9. The apparatus of claim 8 wherein the said wedge shaped ring being constructed of a plurality of abutting rings is composed of two similar rings having abutting faces, the means at said mouth is a cap fastened over said mouth and the means cooperating with said last mentioned means is a set screw for urging both of said similar rings to force said seating-sealing rings into sealing engagement with said body walls.

10. The apparatus as called for in claim 8 wherein the said wedge shaped ring being constructed of a plurality of abutting rings is composed of two similar rings having abutting faces, the means at said mouth is a cap fastened over said mouth and the means cooperating with said last mentioned means is a spring for urging both of said similar rings to force said seating-sealing rings into sealing engagement with said body walls.

11. The apparatus as called for in claim 10 wherein the spring is a coil spring.

12. The apparatus as called for in claim 10 wherein the spring is a Belleville spring.

13. A ball type valve comprising a body having a passageway therethrough and end connections at each end of said passageway, a lateral cavity in said body substantially at right angles to said passageway, said cavity having a mouth and opposed oriented planar walls about said passageway and converging toward each other from said mouth, a flat seating-sealing ring contiguous to each of said walls with an opening through its center to said passageway, each of said rings being composed of an annular disc spring completely covered by a fluorocarbon plastic material and having a shoulder portion adjacent its outer periphery for spacing said ring from its adjoining wall, a wedge shaped ring having converging end faces for retaining said shoulder portions in sealing engagement with their respective contiguous body walls, said faces being spaced from and parallel to said respective walls, a ball shaped closure member within said wedge shaped ring spaced from the interior surfaces thereof and interposed between said seating-sealing rings into said openings, said closure member being mounted for rotational movement from an open to a closed position and having a port opening therethrough disposed in axial alignment with said passageway when said member is in open position, said member flexing said seating-sealing rings in sealing engagement therewith, a cap fastened over said mouth for externally sealing said cavity and means cooperating with said cap for urging said wedge shaped ring to force said seating-sealing rings into sealing engagement with said body walls without moving said closure member out of alignment with said passageway.

References Cited in the file of this patent

UNITED STATES PATENTS

| | | |
|---|---|---|
| 2,297,161 | Newton | Sept. 29, 1942 |
| 2,373,628 | Gleeson | Apr. 10, 1945 |
| 2,883,148 | Williams | Apr. 21, 1959 |
| 2,890,856 | Clade | June 16, 1959 |
| 2,942,840 | Clade | June 28, 1960 |

FOREIGN PATENTS

| | | |
|---|---|---|
| 1,922 | Great Britain | Aug. 22, 1859 |

UNITED STATES PATENT OFFICE
CERTIFICATE OF CORRECTION

Patent No. 3,014,690                          December 2, 1961

Henry W. Boteler

It is hereby certified that error appears in the above numbered patent requiring correction and that the said Letters Patent should read as corrected below.

Column 3, line 15, for "FIG. 8" read -- FIG. 7 --; line 19, for FIG. 7" read -- FIG. 6 --.

Signed and sealed this 1st day of May 1962.

(SEAL)
Attest:

ERNEST W. SWIDER
Attesting Officer

DAVID L. LADD
Commissioner of Patents